United States Patent
Lyu et al.

(10) Patent No.: US 11,634,568 B2
(45) Date of Patent: Apr. 25, 2023

(54) AIR CURABLE ETHYLENE/ALPHA-OLEFIN/DIENE INTERPOLYMER COMPOSITION

(71) Applicant: Dow Global Technologies LLC, Midland, MI (US)

(72) Inventors: Bo Lyu, Shanghai (CN); Yabin Sun, Shanghai (CN); Tao Han, Shanghai (CN); Josef Van Dun, Horgen (CH); Colin LiPiShan, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 401 days.

(21) Appl. No.: 16/651,855

(22) PCT Filed: Sep. 30, 2017

(86) PCT No.: PCT/CN2017/104808
§ 371 (c)(1),
(2) Date: Mar. 27, 2020

(87) PCT Pub. No.: WO2019/061412
PCT Pub. Date: Apr. 4, 2019

(65) Prior Publication Data
US 2020/0255639 A1    Aug. 13, 2020

(51) Int. Cl.
*C08L 23/08* (2006.01)
*C08K 5/3435* (2006.01)
*C08K 5/21* (2006.01)

(52) U.S. Cl.
CPC ........ *C08L 23/0815* (2013.01); *C08K 5/3435* (2013.01); *C08K 5/21* (2013.01)

(58) Field of Classification Search
None
See application file for complete search history.

(56) References Cited

U.S. PATENT DOCUMENTS

| | | | |
|---|---|---|---|
| 5,912,302 A | 6/1999 | Gadkari et al. | |
| 7,465,769 B2 | 12/2008 | Esseghir et al. | |
| 7,829,634 B2 | 11/2010 | Debaud et al. | |
| 2004/0092697 A1 | 5/2004 | Kia et al. | |
| 2005/0197457 A1 | 9/2005 | Chaudhary et al. | |
| 2006/0160985 A1 | 7/2006 | Pacetti et al. | |
| 2007/0173613 A1 | 7/2007 | Chaudhary et al. | |
| 2008/0207845 A1 | 8/2008 | Ashiura et al. | |
| 2010/0120955 A1 | 5/2010 | Chaudhary et al. | |
| 2010/0136273 A1 | 6/2010 | Prieto et al. | |
| 2015/0376385 A1 | 12/2015 | Subramanian | |

FOREIGN PATENT DOCUMENTS

| | | |
|---|---|---|
| JP | 2014-159505 A | 9/2014 |
| JP | 2015-140383 A | 8/2015 |
| WO | 2008097952 A1 | 8/2008 |
| WO | 2008/112690 A2 | 9/2008 |
| WO | 2009085814 A2 | 7/2009 |

*Primary Examiner* — Robert T Butcher
(74) *Attorney, Agent, or Firm* — Quarles & Brady LLP

(57) ABSTRACT

A composition is composed of (A) an ethylene/alpha-olefin/diene TEMPO compound having the Structure (I) and (D) a peroxide. The molar ratio of isocyanate groups of Component (B) to the functional groups of Component (C) is from 0.80 to 1.10. A composition is composed of (A) an ethylene/alpha-olefin/diene interpolymer; a second composition comprising a reaction mixture comprising (B) an isocyanate comprising at least two isocyanate groups and (C) a TEMPO compound having the Structure (I) and (D) a peroxide, wherein the molar ratio of isocyanate groups of Component (B) to the functional groups of Component (C) is from 0.80 to 1.10. In Structure I, $R^1$, $R^2$, $R^3$ and $R^4$ are each independently selected from H and $C_1$-$C_6$ alkyl groups and X is a functional group selected from OH and $NH_2$.

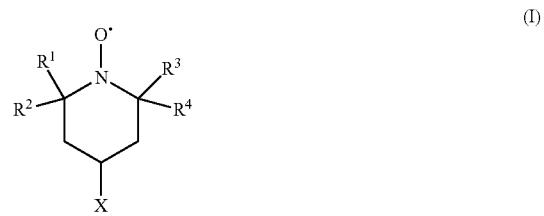

(I)

15 Claims, 1 Drawing Sheet

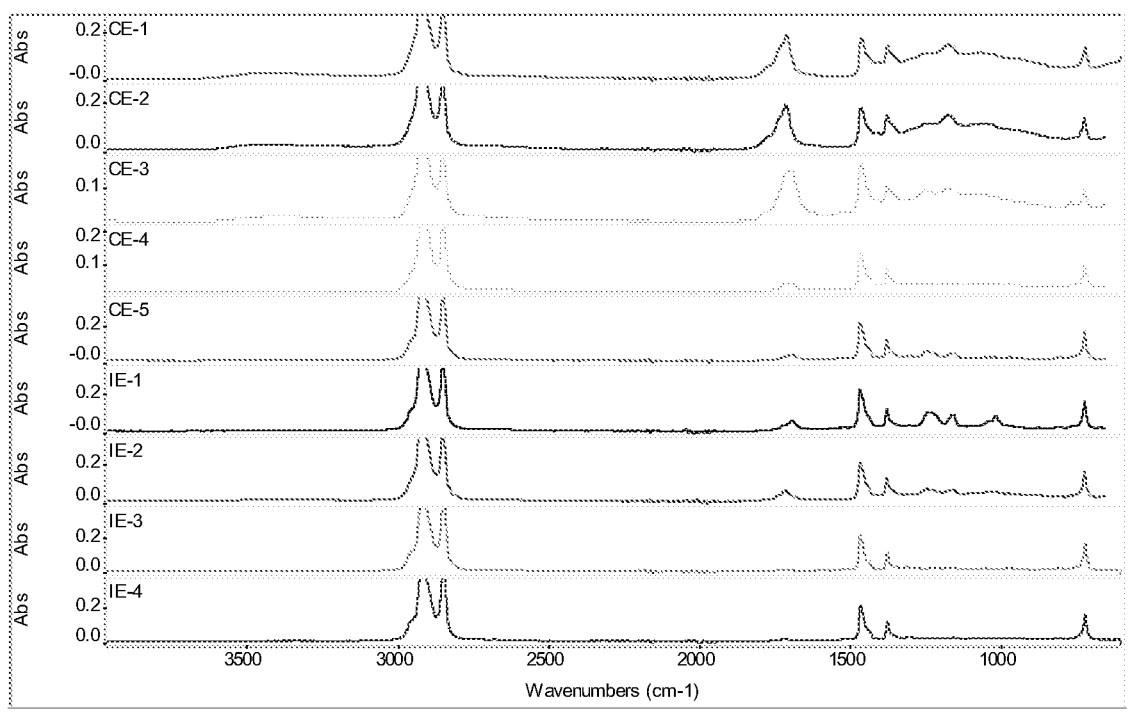

AIR CURABLE ETHYLENE/ALPHA-OLEFIN/DIENE INTERPOLYMER COMPOSITION

BACKGROUND OF THE INVENTION

There are presently two main vulcanization methods for ethylene/alpha-olefin/diene interpolymers (EAODM), such as ethylene propylene diene monomer (EPDM) polymers. Until recently, sulfur vulcanization was the primary method of vulcanizing EAODMs. Due to certain drawbacks with sulfur vulcanization, peroxide vulcanization is currently growing in popularity.

Sulfur vulcanization is completed under atmosphere, meaning the process is simpler and uses simpler equipment. However, the C—S and S—S bonds formed during sulfur vulcanization are weaker than the C—C bonds formed during peroxide vulcanization, and the resulting sulfur-vulcanized EPDM compositions have reduced compression set values and longevity compared to the peroxide-vulcanized EPDM compositions.

Peroxide vulcanization is typically completed in the absence of oxygen. When EPDM is vulcanized via peroxide under atmosphere, carbon radicals react with oxygen followed by degradation to polar functionalities, e.g., carboxylic acids, carbonyl, esters, etc. These polar species create a tacky surface. Surface tackiness is an issue particularly when de-molding of final products is completed at high temperatures. To reduce surface tackiness, peroxide vulcanization uses more expensive and complicated equipment to remove oxygen from the vulcanization environment.

There is a need for new EPDM compositions which are air curable and provide improved mechanical properties and longevity.

U.S. Pat. No. 7,829,634 disclosed a peroxide vulcanization process using nitroxides such as 4-hydroxy-TEMPO as a scorch retardant. US 2010/0120955 disclosed TEMPO compounds as scorch retardants for crosslinking processes.

JP 2014-159505 disclosed a formulation containing a rubber component, peroxide, a nitroxide, and trimethylol-propane trimethacrylate or trimethylol-propane triacrylate for use as a battery sealing material.

JP 2015-140383 disclosed a nitroxide-containing isocyanate compound for use in waterproof materials, adhesive agents, and sealing materials.

However, as discussed above, there is a need for new EPDM compositions which are air curable and provide improved mechanical properties and longevity.

SUMMARY OF THE INVENTION

The invention provides a composition comprising (A) an ethylene/alpha-olefin/diene interpolymer; (B) an isocyanate comprising at least two isocyanate groups; (C) a TEMPO compound having the Structure I:

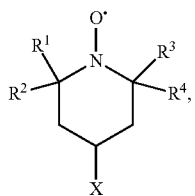

(Structure I)

wherein $R^1$, $R^2$, $R^3$ and $R^4$ are each independently selected from H and $C_1$-$C_6$ alkyl groups and X is a functional group selected from the group consisting of OH and $NH_2$; and (D) a peroxide, wherein the molar ratio of isocyanate groups of Component (B) to the functional groups of Component (C) is from 0.80 to 1.10.

The invention provides a composition comprising (A) an ethylene/alpha-olefin/diene interpolymer; a second composition comprising a reaction mixture comprising (B) an isocyanate comprising at least two isocyanate groups and (C) a TEMPO compound having the Structure I:

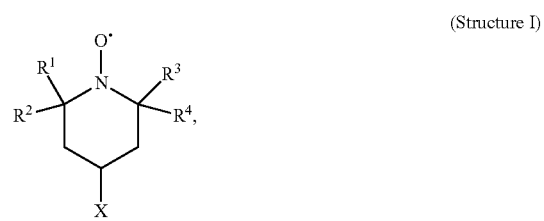

(Structure I)

wherein $R^1$, $R^2$, $R^3$ and $R^4$ are each independently selected from H and $C_1$-$C_6$ alkyl groups and X is a functional group selected from the group consisting of OH or $NH_2$; and (D) a peroxide, wherein the molar ratio of isocyanate groups of Component (B) to the functional groups of Component (C) is from 0.80 to 1.10.

BRIEF DESCRIPTION OF THE FIGURES

FIG. 1 depicts the IR spectra of Comparative Samples 1-5 and Inventive Examples 1-4.

DEFINITIONS

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer," as used herein, refers to a compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

FTIR Method for EPDM Composition Analysis

The terpolymers containing ethylene, propylene, and 5-ethylidene-2-norbornene were analyzed using ASTM D3900 for their respective ethylene contents and ASTM D6047 for their ethylidene-norbornene or dicyclopentadiene contents.

Density

Density is determined in accordance with ASTM D792, Method B. The results are recorded in grams (g) per cubic centimeter (g/cc or g/cm$^2$).

Rheology Ratio

The rheology ratio (RR) (V0.1/V100) is determined by examining samples using melt rheology techniques on a Rheometric Scientific, Inc. ARES (Advanced Rheometric Expansion System) dynamic mechanical spectrometer (DMS). The samples are examined at 190° C., using the dynamic frequency mode, and 25 millimeter (mm) diameter parallel plate fixtures with a 2 mm gap. With a strain rate of 8%, and an oscillatory rate that is incrementally increased from 0.1 to 100 rad/sec, five data points are taken for each decade of frequency analyzed. Each sample (either pellets or bale) is compression molded into 3 inch (7.62 centimeter (cm)) diameter plaques by ⅛ inch (0.049 cm) thick at 20,000 psi (137.9 megaPascals (MPa)) pressure for one minute at 180° C. The plaques are quenched and cooled (over a period of 1 minute) to room temperature. The "25 mm plaques" are cut from the center portion of larger plaques. These 25 mm diameter aliquots are then inserted into the ARES, at 190° C., and allowed to equilibrate for five minutes, prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Viscosity

Viscosity refers to the resistance of a fluid which is being deformed by either sheer stress or tensile stress. For purposes of this specification, viscosity is measured at 190° C. using a Brookfield viscometer as measured in accordance with ASTM D 445.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

The viscosity of each formulated composition is measured using an uncured blanket (see experimental section), so that the viscosity of the uncured composition could be examined. Samples were conditioned for 24 hours at room temperature, prior to testing.

Molecular Weight and Molecular Weight Distribution for Polymer

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions*, 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \Sigma n_i \times M_i / \Sigma n_i = \Sigma w_i / \Sigma (w_i / M_i)$$

where
  $n_i$=number of molecules with molecular weight $M_i$
  $w_i$=weight fraction of material having molecular weight $M_i$
  and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the i$^{th}$ fraction eluting from the GPC column.

The ratio of these two averages, the molecular weight distribution (MWD or $M_w/M_n$), defines the breadth of the molecular weight distribution.

Isocyanate Content

Isocyanate content is determined in accordance with ASTM D5155 and reported in weight percent (wt %).

Isocyanate Functionality

Isocyanate functionality is the average number of isocyanate groups per molecule and is determined by the following equation, using titration and GPC:

$$\text{isocyanate functionality} = \frac{NCO\%_{(by\ titration)} * MW_{(by\ GPC)}}{42}$$

wherein NCO $\%_{(by\ titration)}$ is the isocyanate content determined by titration, $MW_{(by\ GPC)}$ is the molecular weight determined by GPC, and 42 is the molecular weight of a single isocyanate group.

Moving Die Rheometer (MDR) Analysis

MDR cure properties of each formulation are measured in accordance to ASTM D-5289, using an Alpha Technologies MDR 2000. A 4.5 g sample is cut from the compression molded pre-preg and put in the MDR. The MDR test is carried out at 180° C. over a period of 30 minutes at an oscillation frequency of 100 CPM (1.67 Hz) and an oscillation angle of 0.5 degree (7% strain). The minimum torque (ML) maximum torque (MH) exerted by the MDR during the testing interval are reported in dNm. The difference between MH and ML is indicative of the extent of crosslinking, with the greater the difference reflecting a greater extent of crosslinking. The time it takes for torque to reach X % of MH ($t_x$) is reported in minutes. The time required for the increase of 1 (ts1) or 2 (ts2) points from minimum torque is recorded in minutes. The ts1 and ts2 values are indicative of the time required for the crosslinking process to begin. A shorter time indicates crosslinking initiates faster.

FTIR-ATR Analysis (Vulcanized Samples)

The degradation of the hot air vulcanized samples is determined by FTIR-ATR Analysis. Methylene groups ($CH_2$) signal around 1460 $cm^{-1}$ and are used as the industry standard. Carbonyl groups (C=O) signal around 1717 $cm^{-1}$ and are used to monitor the degradation degree. The height ratio between 1714 $cm^{-1}$ and 1460 $cm^{-1}$ represents the degradation degree:

$$D = \frac{H_{1714}}{H_{1460}}$$

wherein D is the degradation degree, $H_{1714}$ is the IR peak height at 1714 $cm^{-1}$ (using 1845-1542 $cm^{-1}$ as a baseline), and $H_{1460}$ is the IR peak height at 1460 $cm^{-1}$ (using 1583-1396 $cm^{-1}$ as a baseline).

Relative degradation degree is calculated according to the formula below:

$$RD = \frac{D}{D_0}$$

wherein RD is the relative degradation degree, D is the degradation degree of the tested specimen, and $D_0$ is the degradation degree of CS1 (control).

Finger Test (Surface Tackiness)

The hot air vulcanized samples are tested for surface tackiness using the Finger Test. The Finger Test is a laboratory qualitative test method. Laboratory testers use their fingers to touch the vulcanized pre-preg and provide feedback regarding the surface tackiness of the sample using the following criteria:

| Tackiness Rating | Tester Feeling |
|---|---|
| 3 | Surface is not tacky, feels like normal rubber sheet |
| 2 | Only a little tackiness could be felt by finger |
| 1 | Surface felt like adhesive tape |

DETAILED DESCRIPTION OF THE INVENTION

As discussed above, the invention provides a composition comprising (A) an ethylene/alpha-olefin/diene interpolymer;
(B) an isocyanate comprising at least two isocyanate groups;
(C) a TEMPO compound having the Structure I:

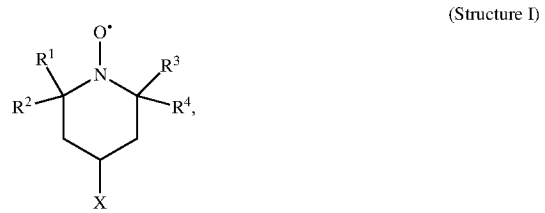

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the ratio of the molar amount of isocyanate groups of component (B) to the molar amount of functional groups of component (C) is from 0.80 to 1.10.

The composition may comprise a combination of two or more embodiments described herein.

The invention also provides a vulcanized, or crosslinked, composition formed from a composition of one or more embodiments described herein.

The invention also provides an article comprising at least one component formed from a composition of one or more embodiments described herein. In a further embodiment, the article is selected from the group consisting of profiles, injection molded parts, gaskets, automotive parts, building and construction materials, shoe components, and tubes.

In one embodiment, the article is an automotive part.

The invention also provides an article comprising at least one component formed from a crosslinked composition of one or more embodiments described herein. In a further embodiment, the article is selected from the group consisting of profiles, injection molded parts, gaskets, automotive parts, building and construction materials, shoe components, and tubes.

The composition may comprise a combination of two or more embodiments described herein.

An article may comprise a combination of two or more embodiments described herein.

Ethylene/Alpha-Olefin/Diene Interpolymer (EAODM)

The composition includes an ethylene/alpha-olefin/diene interpolymer. The ethylene/alpha-olefin/diene interpolymer comprises, in polymerized form, a majority amount of ethylene, an alpha-olefin, and a diene.

In an embodiment, the EAODM comprises from 50 wt %, or greater than 50 wt %, or 60 wt %, or 65 wt %, or 70 wt %, or 75 wt % to 80 wt %, or 85 wt %, or 90 wt %, or 95 wt % ethylene, based on the total weight of the EAODM, as measured according to the FTIR method of analysis.

The alpha-olefin may be either an aliphatic or an aromatic compound. In an embodiment, the alpha-olefin is preferably a $C_3$-$C_{20}$ aliphatic compound, or a $C_3$-$C_{16}$ aliphatic compound, or a $C_3$-$C_{10}$ aliphatic compound. Exemplary $C_3$-$C_{10}$ aliphatic alpha-olefins are propylene, 1-butene, 1-hexene and 1-octene. In an embodiment, the alpha-olefin is propylene.

In an embodiment, the EAODM comprises from 10 wt %, or 12 wt %, or 15 wt %, or 18 wt %, or 20 wt %, or 22 wt %, or 25 wt % to 28 wt %, or 30 wt %, or 32 wt %, or 35 wt % alpha-olefin, based on the total weight of the EAODM, as measured according to the FTIR method of analysis.

Illustrative dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In an embodiment, the diene is selected from ENB, dicyclopentadiene, 1,4-hexadiene, 7-methyl-1,6-octadiene, and preferably, ENB, dicyclopentadiene and 1,4-hexadiene. In an embodiment, the diene is selected from ENB and dicyclopentadiene. In an embodiment, the diene is ENB.

In an embodiment, the EAODM comprises from greater than 0 wt %, or 0.5 wt %, or 1 wt %, or 2 wt %, or 2.5 wt %, or 3 wt %, or 3.5 wt %, or 4 wt %, or 4.5 wt %, or 5 wt % to 5.5 wt %, or 6 wt %, or 6.5 wt %, or 7 wt %, or 7.5 wt %, or 8 wt %, or 9 wt %, or 10 wt % diene, based on the total weight of the EAODM, as measured according to the FTIR method of analysis.

In an embodiment, the ethylene/alpha-olefin/diene interpolymer is an ethylene/propylene/diene interpolymer (EPDM). In a further embodiment, the diene is ENB.

In an embodiment, the density of the EAODM is from 0.860 g/cc, 0.865 g/cc to 0.870 g/cc, or 0.880 g/cc, or 0.890 g/cc, or 0.900 g/cc.

In one embodiment, the EAODM has a rheology ratio (V0.1/V100 at 190° C.) from greater than or equal to 20, or greater than or equal to 30, or greater than or equal to 40, or greater than or equal to 50 to 60, or 70, or 80. The rheology ratio (V0.1/V100 at 190° C.) of the EAODM is that of the neat polymer (no oil, no filler). The interpolymer may be stabilized with "ppm amounts" of one or more antioxidants and/or other stabilizers.

In one embodiment, the EAODM has a viscosity at 0.1 rad/sec, 190° C., from 120,000 Pa·s, or 130,000 Pa·s, or 140,000 Pa·s to 180,000 Pa·s, or190,000 Pa·s, or 200,000 Pa·s.

In one embodiment, the EAODM comprises from 3.0 weight percent (wt %), or 4.0 wt %, or 5.0 wt % to 7.0 wt %, or 10.0 wt %, or 12.0 wt % diene, based on the weight of the interpolymer.

In one embodiment, the EAODM has a Mooney Viscosity greater than or equal to 10, or greater than or equal to 15, or greater than or equal to 20, or greater than or equal to 25, or greater than or equal to 30, or greater than or equal to 35, or greater than or equal to 40 to less than or equal to 60, or less than or equal to 70, or less than or equal to 80, or less than or equal to 85, or less than or equal to 90, or less than or equal to 100 (ML 1+4, 125° C.). Mooney viscosity is that of the neat polymer (no oil, no filler). The polymer may be stabilized with "ppm amounts" of one or more antioxidants and/or other stabilizers.

In one embodiment, the EAODM has a molecular weight distribution (MWD, or Mw/Mn) greater than or equal to 1.2, or greater than or equal to 1.5, or greater than or equal to 1.7, or greater than or equal to 1.8, or greater than or equal to 2.0, or greater than or equal to 2.2 to less than or equal to 2.5, or less than or equal to 3.0, or less than or equal to 3.5, or to less than or equal to 4.0, or to less than or equal to 5.0.

In one embodiment, the EAODM has a weight average molecular weight (Mw) from 80,000 g/mol, or 100,000 g/mol to less than or equal to 200,000 g/mol, or less than or equal to 300,000 g/mol, or less than or equal to 400,000 g/mol.

In an embodiment, the EAODM has one, some or all of the following properties:
 (i) a density from 0.865 g/cc, or 0.870 g/cc to 0.875 g/cc, or 0.880 g/cc, or 0.885 g/cc;
 (ii) an ethylene content from 60 wt %, or 65 wt % to 70 wt %, or 75 wt %, based on the total weight of the EAODM;
 (iii) a diene content from 4 wt %, or 4.5 wt % to 5 wt %, or 5.5 wt %, based on the total weight of the EAODM; and
 (iv) a Mooney viscosity from greater than or equal to 20, or greater than or equal to 25, or greater than or equal to 30, or greater than or equal to 35, or greater than or equal to 40 to less than or equal to 60, or less than or equal to 70.

In an embodiment, the EAODM has, at least two, or at least three, or all four of properties (i)-(iv).

In an embodiment, the EAODM is an EPDM having one, some or all of the following properties:
 (i) a density from 0.865 g/cc, or 0.870 g/cc to 0.875 g/cc, or 0.880 g/cc, or 0.885 g/cc;
 (ii) an ethylene content from 60 wt %, or 65 wt % to 70 wt %, or 75 wt %, based on the total weight of the EPDM;
 (iii) an ENB content from 4 wt %, or 4.5 wt % to 5 wt %, or 5.5 wt %, based on the total weight of the EPDM; and
 (iv) a Mooney viscosity from greater than or equal to 20, or greater than or equal to 25, or greater than or equal to 30, or greater than or equal to 35, or greater than or equal to 40 to less than or equal to 60, or less than or equal to 70.

In an embodiment, the EPDM has, at least two, or at least three, or all four of properties (i)-(iv).

Nonlimiting examples of commercially available EAODMs include NORDEL IP 4725, an ethylene/propylene/ENB terpolymer having a density of 0.88 g/cc, an ethylene content of 70 wt %, an ENB content of 4.9 wt %, and a Mooney viscosity of 25, available from the Dow Chemical Company, and NORDEL IP 4760, an ethylene/propylene/ENB terpolymer having a density of 0.88 g/cc, an ethylene content of 67 wt %, an ENB content of 4.9 wt %, and a Mooney viscosity of 60, available from the Dow Chemical Company.

In one embodiment, the EAODM is present in the composition in an amount from greater than or equal to 50 wt %, or greater than or equal to 75 wt %, or greater than or equal to 90 wt %, or greater than or equal to 95 wt % to 96 wt %, or 97 wt %, or 98 wt %, or 99 wt %, or 99.5 wt %, or 99.75 wt %, based on the total weight of the composition.

In an embodiment, the composition may include a mixture of two or more EAODM as described herein. In an embodiment, the sum total amount of all EAODM in the composition is from greater than or equal to 50 wt %, or greater than or equal to 75 wt %, or greater than or equal to 90 wt %, or greater than or equal to 95 wt % to 96 wt %, or 97 wt %, or 98 wt %, or 99 wt %, or 99.5 wt %, or 99.75 wt %, based on the total weight of the composition.

The EAODM, further an EPDM, may comprise a combination of two or more embodiments as described herein.

Isocyanate

The composition includes an isocyante comprising at least two isocyanate groups. An isocyanate group is represented by the formula: —N=C=O.

The isocyanate may be an organic compound or a polymeric compound.

Organic isocyanates are compounds represented by the Structure II:

R(NCO)$_n$ (Structure II), wherein n is from 2, or 3 to 4 and R is an aliphatic, alicyclic, aliphatic-alicyclic, aromatic, or aliphatic-aromatic hydrocarbon or an inertly-substituted hydrocarbon radical of 4, or 6 to 13, or 20, or 26 carbon atoms. "Inertly substituted" means that the compound, radical or other group can bear one or more substituents that are essentially nonreactive with the reagents and products of the vulcanization process.

Nonlimiting examples of suitable organic isocyanate compounds having at least two isocyanate groups include tetramethylene diisocyanate; hexamethylene diisocyanate; trimethylhexamethylene diisocyanate; dimer acid diisocyanate; isophorone diisocyanate; diethylbenzene diisocyanate; decamethylene 1,10-diisocyanate; cyclohexylene 1,2-diisocyanate; cyclohexylene 1,4-diisocyanate; 2,4-tolylene diisocyanate; 2,6-tolylene diisocyanate; 4,4-diphenylmethane diisocyanate; 1,4-naphthalene diisocyanate; dianisidine diisocyanate; toluidine diisocyanate; m-xylylene diisocyanate; tetrahydronaphthalene-1,5-diisocyanate; and bis(4-isocyanatophenyl)methane.

Polymeric isocyanates are compounds represented by the structure III:

(OCN)R—[R'(NCO)]$_n$—R"(NCO) (Structure III), wherein n is 1 to 4, or 6, or 8, or 10 and R, R' and R" are each independently an aliphatic, alicyclic, aliphatic-alicyclic, aromatic, or aliphatic-aromatic hydrocarbon or an inertly-substituted hydrocarbon radical of 4, or 6 to 13, or 20, or 26 carbon atoms.

In an embodiment, the isocyanate is a polymeric isocyanate having the Structure IV:

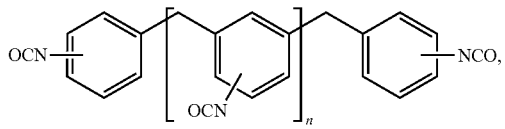

(Structure IV)

wherein n is 0 to 4.

Nonlimiting examples of suitable polymeric isocyanate compounds having at least two isocyanate groups include neopentyl tetraisocyanate and 4,4-diphenylmethane diisocyanate.

In an embodiment, the isocyanate is a mixture of di-, and/or tri-, and/or tetra-isocyanates. Di-isocyanates are isocyanates containing 2 isocyanate groups in one molecule. Tri-isocyanates are isocyanates containing 3 isocyanate groups in one molecule. Tetra-isocyanates are isocyanates containing 4 isocyanate groups in one molecule. Mixtures isocyanates with different numbers of isocyanate groups result in an isocyanate component having a isocyanate functionality between 2 and 3 or between 3 and 4. A nonlimiting commercial example of a mixture of di- and tri-functional isocyanates is PAPI 901 available from The Dow Chemical Company. A nonlimiting commercial example of a mixture of tri- and tetra-functional isocyanates is DESMODUR N 3300, available from Convestro.

In an embodiment, the isocyanate has an isocyanate content, by weight, from 7 wt %, or 10 wt %, or 15 wt % to 20 wt % to 25 wt %, or 30 wt %, or 35 wt %, or 40 wt % measured in accordance with ASTM D5155.

In an embodiment, the isocyanate has an isocyanate functionality from greater than or equal to 2.00, or 2.25, or 2.50, or 2.75, or 3.00 to 3.25, or 3.50, or 3.75, or less than or equal to 4.00.

In an embodiment, the isocyanate has one, some or all of the following properties:

(i) an isocyanate content from 20 wt %, or 25 wt % to 30 wt % or 35 wt %, based on the total weight of the isocyanate and as measured in accordance with ASTM D5155; and (ii) an isocyanate functionality from 2.5, or 2.6, or 2.7 to 2.8, or 2.9, or 3.0, or 3.1.

In an embodiment, the isocyanate has both properties (i) and (ii).

In addition to the isocyanate mixtures PAPI 901 and DESMODUR N 3300 listed above, exemplary isocyanates further include, and are not limited to, PAPI 27, a polymeric methylene diphenyl diisocyanate (MDI) with an average molecular weight of 340, an isocyanate content of 31.4 wt % based on the total weight of the isocyanate, and an isocyanate functionality of 2.7, available from the Dow Chemical Company, and DESMODUR N 3900, an aliphatic polyisocyanate based on hexamethylene diisocyanate with an isocyanate content of 23.5 wt %+/−0.5 wt % based on the total weight of the isocyanate and an isocyanate functionality of 3.0, available from Covestro.

In an embodiment, the isocyanate is present in an amount from greater than 0 wt %, or 0.25 wt %, or 0.5 wt %, or 0.75 wt %, or 1.00 wt %, or 1.25 wt %, or 1.50 wt % to 1.75 wt %, or 2.00 wt %, or 2.25 wt %, or 2.50 wt %, or 2.75 wt %, or 3.00 wt %, or 3.5 wt %, or 4.0 wt %, or 5.0 wt %, based on the total weight of the composition.

An isocyanate may comprise a combination of two or more embodiments as described herein.

TEMPO Compound

The composition includes a TEMPO compound having the Structure I:

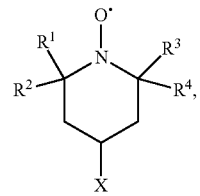

(Structure I)

wherein $R^1$, $R^2$, $R^3$ and $R^4$ are each independently selected from H and $C_1$-$C_6$ alkyl groups and X is a functional group selected from OH and $NH_2$. In an embodiment, each of $R^1$, $R^2$, $R^3$ and $R^4$ are the same. In an embodiment, at least one of $R^1$, $R^2$, $R^3$ and $R^4$ is different than the others of $R^1$, $R^2$, $R^3$ and $R^4$.

In an embodiment, X is OH.

In an embodiment, $R^1$, $R^2$, $R^3$ and $R^4$ are the same.

In an embodiment, $R^1$, $R^2$, $R^3$ and $R^4$ are the same and selected from H and a methyl group.

In an embodiment, X is OH and $R^1$, $R^2$, $R^3$ and $R^4$ are the same.

In an embodiment, X is OH and $R^1$, $R^2$, $R^3$ and $R^4$ are the same and selected from H and a methyl group.

In an embodiment, X is OH and each of $R^1$, $R^2$, $R^3$ and $R^4$ is a methyl group.

In an embodiment, the TEMPO compound is 4-hydroxy-2,2,6,6-tetramethylpiperidin-1-oxyl.

In an embodiment, the TEMPO compound is present in an amount from greater than 0 wt %, or 0.25 wt %, or 0.5 wt %, or 0.75 wt %, or 1.00 wt %, or 1.25 wt %, or 1.50 wt % to 1.75 wt %, or 2.00 wt %, or 2.25 wt %, or 2.50 wt %, or 2.75 wt %, or 3.00 wt %, or 3.5 wt %, or 4.0 wt %, or 5.0 wt %, based on the total weight of the composition.

A TEMPO compound may comprise a combination of two or more embodiments as described herein.

Peroxide

The composition includes a peroxide. Suitable peroxides include, but are not limited to, aromatic diacyl peroxides; aliphatic diacyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxode; tert-butyl-perbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethyl-cyclohexane; lauroyl peroxide; succinic acid peroxide; cyclohexanone peroxide; t-butyl peracetate; butyl hydroperoxide; and combinations thereof.

In an embodiment, the peroxide is present in an amount from greater than 0 wt %, or 0.5 wt %, or 1.0 wt %, or 1.25 wt %, or 1.50 wt %, or 1.75 wt % to 2.00 wt %, or 2.25 wt %, or 2.50 wt %, or 2.75 wt %, or 3.00 wt %, or 3.5 wt %, or 4.0 wt %, or 5.0 wt %, based on the total weight of the composition.

A crosslinking agent may comprise a combination of two or more embodiments as described herein.

Optional Additives

In an embodiment, the composition optionally includes one or more additives. Nonlimiting examples of additives include oils, fillers, processing aids and/or stabilizers.

In one embodiment, the composition includes one or more oils. In an embodiment, the weight ratio of the first composition to the oil is 2/1 to 4/1. Oils include, but are not limited to, petroleum oils, such as paraffinic, aromatic and naphthenic oils; polyalkylbenzene oils; organic acid monoesters; and combinations thereof.

In one embodiment, the composition further comprises one or more fillers. Fillers include, but are not limited to, clay, calcium carbonate, talc, carbon black, silica, mineral fillers, and combinations thereof.

In one embodiment, the composition further includes one or more processing aids. Nonlimiting examples of processing aids include aliphatic acid, mineral aliphatic acid salts, polyethylene glycol and combinations thereof.

In one embodiment, the composition includes one or more stabilizers. Stabilizers are organic molecules that inhibit oxidation, or a collection of such molecules. Stabilizers function to provide antioxidizing properties to a polyolefin composition and/or crosslinked polyolefin product. Nonlimiting examples of suitable stabilizers include 2,2,4-trimethyl-1,2-dihydroquinoline, polymerized (e.g., Vulnanox HS/LG or TMQ); zinc 20mercaptotolumidazole (e.g., VANOX ZMTI); bis(4-(1-methyl-1-phenylethyl)pneyl) amine (e.g., NAUGARD 445); 2,2'-methylene-bis(4-methyl-6-t-butylphenol) (e.g., VANOX MBPC); 2,2'-thiobis (2-t-butyl-5-methylphenol) (CAS No. 90-66-4, commercially available as LOWINOX TBM-6); 2,2;-thiobis (6-t-butyl-4-methylpneol) (CAS NO. 90-66-4, commercially available as LOWINOX TBP-6); tris[(4-tert-butyl-3-hydroxy-2,6-dimethylphenyl)methyl]0-1,3,5-triazine-2,4,6-trione (e.g., CYANOX 1790); pentaerythritol tetraki(3-(3,5-bis(1,1-dimethylethyl)-4-hydroxyphenyl)propionate (e.g., IRGANOX 1010, CAS No. 6683-19-8); 3,5-bis(1,1-dimethyl)-4-hydroxybenzenepropanoic acid 2,2'-thiodiethanediyl ester (e.g., IRGANOX 1035, CAS No. 41484-35-9); and distearyl thiodipropionate ("DSTDP"). When present, the one or more stabilizers is present in an amount from 0.01 phr, or 0.1 phr, or 0.5 phr to 1.0 phr, or 2.0 phr, or 4.0 phr, based on the EAODM.

Composition

The invention provides a composition comprising (A) an ethylene/alpha-olefin/diene interpolymer; (B) an isocyanate comprising at least two isocyanate groups; (C) a TEMPO compound having the Structure I:

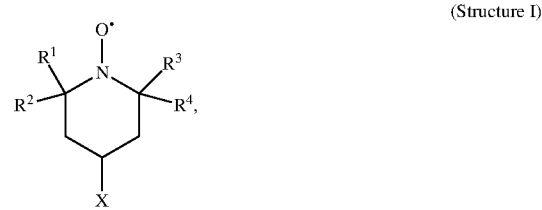

(Structure I)

wherein $R^1$, $R^2$, $R^3$ and $R^4$ are each independently selected from H and $C_1$-$C_6$ alkyl groups and X is a functional group selected from OH or $NH_2$; and (D) a peroxide, wherein the ratio of the molar amount of isocyanate groups of component (B) to the molar amount of functional groups of component (C) is from 0.80 to 1.10.

In an embodiment, the molar ratio of isocyanate groups of component (B) to the molar amount of functional groups of component (C) is from 0.80, or 0.85, or 0.90, or 0.95 to 1.00, or 1.05, or 1.10.

The molar ratio of isocyanate groups of component (B) to the molar amount of functional groups of component (C) is calculated using the following equation:

$$\text{molar ratio} = \frac{\frac{W_{total\ isocyanate}}{42} \times \text{wt }\%_{isocyanate}}{\frac{W_{TEMPO}}{MW_{TEMPO}} \times functionality_{TEMPO}}$$

wherein $W_{total\ isocyanate}$ is the total weight of isocyanate compound or polymer, 42 is the molecular weight of a single isocyanate group, Wt $\%_{isocyanate}$ is the weight percent of isocyanate functionality, $W_{TMEPO}$ is the weight of TEMPO molecule, $MW_{TEMPO}$ is the molecular weight of the TEMPO compound, and functionality$_{TEMPO}$ is the functionality of the TEMPO compound.

In an embodiment, the composition is prepared by mixing (A) the EAODM, (B) isocyanate, (C) TEMPO compound and (D) peroxide. In an embodiment, the (B) isocyanate and (C) TEMPO compound may be pre-mixed with an EAODM carrier in the form of a masterbatch.

When the isocyanate and TEMPO compound are mixed with the EAODM and peroxide in a single-step process, the isocyanate and TEMPO compound may react to form a second composition which includes the reaction product of the isocyanate and the TEMPO compound. In such an embodiment, the composition comprises the ethylene/alpha-olefin/diene interpolymer, a reaction product of the isocya nate and the TEMPO compound, and the peroxide, as well as an amount of unreacted isocyanate and TEMPO compound.

In an embodiment, the reaction product of the isocyanate and the TEMPO compound has the Structure (V):

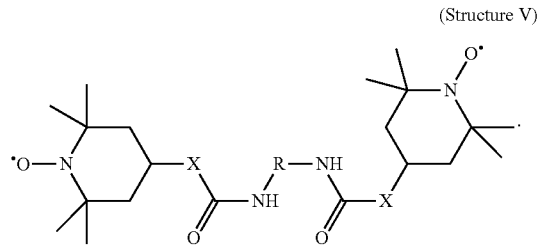

(Structure V)

When the isocyanate and TEMPO compound are added in the form of a masterbatch, the isocyanate and TEMPO compound may react for form a second composition which includes the reaction product of the isocyanate and TEMPO compound. The second composition is then combined with the EAODM and peroxide to form the composition.

In an embodiment, the reaction product of the isocyanate and TEMPO compound, as found in the second composition, has the Structure (V) above.

Crosslinked Composition

In an embodiment, the invention provides a crosslinked composition comprising the reaction product of a composition comprising (A) an ethylene/alpha-olefin/diene interpolymer; (B) an isocyanate comprising at least two isocyanate groups; (C) a TEMPO compound having the Structure I:

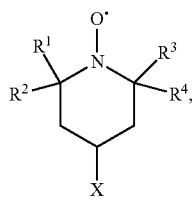

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the

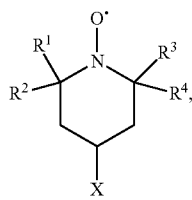

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the ratio of the molar amount of isocyanate groups of component (B) to the molar amount of functional groups of component (C) is from 0.80 to 1.10.

In an embodiment, the crosslinked EAODM has the structure VI:

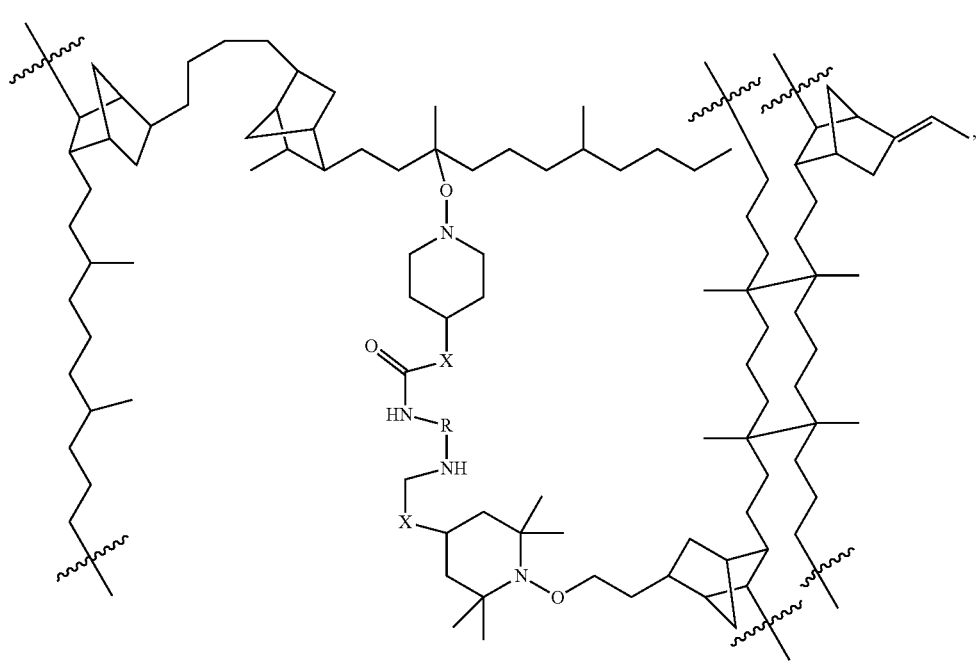

(Structure VI)

wherein X is as defined with respect to Structure I.

In an embodiment, the crosslinked composition is formed by thermally treating a composition comprising (A) an ethylene/alpha-olefin/diene interpolymer; (B) an isocyanate comprising at least two isocyanate groups; (C) a TEMPO compound having the Structure I:

ratio of the molar amount of isocyanate groups of component (B) to the molar amount of functional groups of component (C) is from 0.80 to 1.10.

In an embodiment, the temperature at which the composition is thermally treated to produce the crosslinked composition is from 50° C., or 60° C., or 70° C., or 80° C., or 90° C., or 100° C., or 105° C. to 110° C., or 115° C., or 120° C., or 130° C., or 140° C., or 150° C.

In an embodiment, the crosslinked composition is a thermally treated composition comprising (A) an ethylene/alpha-olefin/diene interpolymer having a diene content from 4 wt %, or 4.5 wt % to 5 wt %, or 5.5 wt %; (B) an isocyanate comprising at least two isocyanate groups; (C) a TEMPO compound having the Structure I:

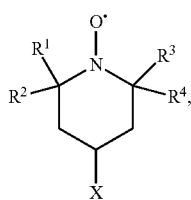

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the ratio of the molar amount of isocyanate groups of component (B) to the molar amount of functional groups of component (C) is from 0.80 to 1.10 (hereinafter "Crosslinked Composition 1").

In an embodiment, the crosslinked composition is a thermally treated composition comprising (A) an ethylene/propylene/diene interpolymer having a diene content from 4 wt %, or 4.5 wt % to 5 wt %, or 5.5 wt %; (B) an isocyanate comprising at least two isocyanate groups; (C) a TEMPO compound having the Structure I:

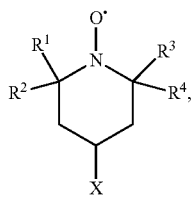

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the ratio of the molar amount of isocyanate groups of component (B) to the molar amount of functional groups of component (C) is from 0.80 to 1.10 (hereinafter "Crosslinked Composition 2").

In an embodiment, the crosslinked composition is a thermally treated composition comprising (A) an ethylene/propylene/ENB interpolymer having an ENB content from 4 wt %, or 4.5 wt % to 5 wt %, or 5.5 wt %; (B) an isocyanate comprising at least two isocyanate groups; (C) a TEMPO compound having the Structure I:

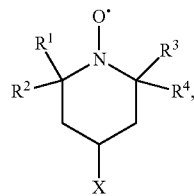

(Structure I)

wherein $R^1$, $R^2$, $R^3$ and $R^4$ are each independently selected from H and $C_1$-$C_6$ alkyl groups and X is a functional group selected from OH and $NH_2$; and (D) a peroxide, wherein the ratio of the molar amount of isocyanate groups of component (B) to the molar amount of functional groups of component (C) is from 0.80 to 1.10 (hereinafter "Crosslinked Composition 3").

In an embodiment, the crosslinked composition is Crosslinked Composition 1, Crosslinked Composition 2, or Crosslinked Composition 3 and has an MH from 14.50 dNm, or 14.75 dNm, or 15.00 dNm, or 15.25 dNm, or 15.50 dNm to 15.75 dNm, or 16.00 dNm, or 16.25 dNm, or 16.50 dNm, or 16.75 dNm, or 17.00 dNm, as measured in accordance with ASTM D-5289.

In an embodiment, the crosslinked composition is Crosslinked Composition 1, Crosslinked Composition 2, or Crosslinked Composition 3 and has a ML from 0.40 dNm, or 0.45 dNm, or 0.50 dNm, or 0.55 dNm to 0.60 dNm, or 0.65 dNm, or 0.70 dNm, or 0.75 dNm, as measured in accordance with ASTM D-5289.

In an embodiment, the crosslinked composition is Crosslinked Composition 1, Crosslinked Composition 2, or Crosslinked Composition 3 and has a MH-ML from 14.00 dNm, or 14.25 dNm, or 14.50 dNm, or 14.75 dNm, or 15.00 dNm to 15.25 dNm, or 15.50 dNm, or 15.75 dNm, or 16.00 dNm, or 16.25 dNm, or 16.50 dNm, as measured in accordance with ASTM D-5289.

In an embodiment, the crosslinked composition is Crosslinked Composition 1, Crosslinked Composition 2, or Crosslinked Composition 3 and has a ts1 from 0.80 min., or 0.82 min., or 0.85 min., or 0.87 min., or 0.90 min., or 0.92 min., or 0.95 min. to 0.97 min., or 1.00 min., or 1.02 min., or 1.05 min., or 1.07 min., or 1.10 min., or 1.12 min., or 1.15 min., or 1.17 min., or 1.20 min., as measured in accordance with ASTM D-5289.

In an embodiment, the crosslinked composition is Crosslinked Composition 1, Crosslinked Composition 2, or Crosslinked Composition 3 and has a ts2 from 1.00 min., or 1.05 min., or 1.10 min., or 1.15 min. to 1.20 min., or 1.25 min., or 1.30 min., or 1.35 min., or 1.40 min., or 1.45 min., as measured in accordance with ASTM D-5289.

In an embodiment, the crosslinked composition is Crosslinked Composition 1, Crosslinked Composition 2, or Crosslinked Composition 3 and has a $t_{90}$ from 7.00 min., or 7.05 min., or 7.10 min., or 7.15 min., or 7.20 min., or 7.25 min., or 7.30 min., or 7.35 min., or 7.40 min. to 7.45 min., or 7.50 min., or 7.55 min., or 7.60 min., or 7.65 min., or 7.70 min., or 7.75 min., or 7.80 min., or 7.85 min., or 7.90 min., or 7.95 min., or 8.00 min.

In an embodiment, the crosslinked composition is hot air vulcanized to form an article.

In an embodiment, Crosslinked Composition 1 is hot air vulcanized to form Article 1.

In an embodiment, Crosslinked Composition 2 is hot air vulcanized to form Article 2.

In an embodiment, Crosslinked Composition 3 is hot air vulcanized to form Article 3.

In an embodiment, the hot air vulcanized crosslinked article is Article 1, Article 2 or Article 3 and has a $H_{1714}$ from less than 60, or less than 55, or less than 50, or less than 45, or less than 40, or less than 35, or less than 30, or less than 25 to 10, or 9, or 8, or 7, or 6, or 5, or 4, or 3, or 2, or 1.

In an embodiment, the hot air vulcanized crosslinked article is Article 1, Article 2 or Article 3 and has a $H_{1460}$ from 130, or 135, or 140, or 145, or 150, or 155, or 160 to 165, or 170, or 175, or 180, or 185, or 190, or 195, or 200.

In an embodiment, the hot air vulcanized crosslinked article is Article 1, Article 2 or Article 3 and has a degradation degree from 0.020, or 0.040, or 0.060, or 0.080, or 0.100, or 0.120, or 0.140, or 0.160 to 0.180, or 0.200, or 0.220, or 0.240, or 0.260, or 0.280, or 0.300.

In an embodiment, the hot air vulcanized crosslinked article has a relative degradation of less than or equal to 20%, or less than or equal to 15%, or less than or equal to 10%, or less than or equal to 9%, or less than or equal to 8%, or less than or equal to 5%, or less than or equal to 3%, or less than or equal to 2.5%, or less than or equal to 2%, or less than or equal to 1.8%, or less than or equal to 1.6%.

In an embodiment, the hot air vulcanized crosslinked article is Article 1, Article 2 or Article 3 and has a relative degradation of less than or equal to 20%, or less than or equal to 15%, or less than or equal to 10%, or less than or equal to 9%, or less than or equal to 8%, or less than or equal to 5%, or less than or equal to 3%, or less than or equal to 2.5%, or less than or equal to 2%, or less than or equal to 1.8%, or less than or equal to 1.6%.

In an embodiment, the crosslinked composition is Crosslinked Composition 1, Crosslinked Composition 2, or Crosslinked Composition 3 and comprises one, some or all of the following properties:
(i) an MH from 14.70 dNm, or 14.80 dNm, or 14.90 dNm, or 15.00 dNm, or 15.20 dNm, or 15.40 dNm, 15.60 dNm to 15.80 dNm, or 16.00 dNm, or 16.20 dNm, or 16.40 dNm, or 16.50 dNm, or 16.60 dNm, or 16.70 dNm, or 16.80 dNm, as measured in accordance with ASTM D-5289; and/or
(ii) an ML from 0.450 dNm, or 0.475 dNm, or 0.500 dNm, or 0.525 dNm, or 0.550 dNm to 0.575 dNm, or 0.600 dNm, or 0.625 dNm, or 0.650 dNm, or 0.675 dNm, or 0.700 dNm, as measured in accordance with ASTM D-5289; and/or
(iii) an MH-ML from 14.00 dNm, or 14.25 dNm, or 14.50 dNm, or 14.75 dNm, or 15.00 dNm to 15.25 dNm, or 15.50 dNm, or 15.75 dNm, or 16.00 dNm, or 16.25 dNm, as measured in accordance with ASTM D-5289; and/or
(iv) a ts1 from 0.850 min., or 0.875 min., or 0.900 min., or 0.925 min., or 0.95 min., or 0.975 min. to 1.00 min., or 1.025 min., or 1.050 min., or 1.075 min., or 1.100 min., or 1.125 min., or 1.150 min., or 1.175 min; and/or
(v) a ts2 from 1.04 min., or 1.06 min., or 1.08 min., or 1.10 min, or 1.12 min., or 1.14 min., or 1.16 min., or 1.18 min. to 1.20 min., or 1.22 min., or 1.24 min., or 1.26 min., or 1.28 min., or 1.30 min., or 1.32 min., or 1.34 min., or 1.36 min., or 1.38 min, or 1.40 min.; and/or
(vi) a $t_{90}$ from 7.250 min., or 7.300 min., or 7.350 min., or 7.400 min., or 7.450 min. to 7.500 min., or 7.550 min., or 7.600 min., or 7.650 min., or 7.700 min., or 7.750 min., or 7.800 min.

In an embodiment, the crosslinked composition is Crosslinked Composition 1, Crosslinked Composition 2, or Crosslinked Composition 3 and comprises at least two, at least three, at least four, at least five, or all six of properties (i)-(vi).

In an embodiment, the crosslinked composition is hot air vulcanized to form Article 1, Article 2 or Article 3 and the article comprises one, some or all of the following properties:
(i) an $H_{1714}$ from less than 30, or less than 25, or less than 20, or less than 15 to 10, or, 8, or 6, or 5, or 4, or 3, or 2, or 1; and/or
(ii) an $H_{1460}$ from 150, or 155, or 160, or 165, or 170, or 175 to 180, or 185, or 190, or 195, or 200; and/or
(iii) a degradation degree from 0.025, or 0.050, or 0.075, or 0.100, or 0.125, or 0.150, or 0.175 to 0.200, or 0.225, or 0.250, or 0.275, or 0.300; and/or
(iv) a relative degradation of less than 15%, or less than 10%, or less than 5%, or less than 3%, or less than 2%.

In an embodiment, the hot air vulcanized crosslinked article is Article 1, Article 2, or Article 3 and comprises at least two, or at least three, or all four of properties (i)-(iv).

In an embodiment, the crosslinked composition is Crosslinked Composition 1, Crosslinked Composition 2, or Crosslinked Composition 3 and comprises one, some or all of the following properties:
(i) an MH from 14.70 dNm, or 14.80 dNm, or 14.90 dNm, or 15.00 dNm, or 15.20 dNm, or 15.40 dNm, 15.60 dNm to 15.80 dNm, or 16.00 dNm, or 16.20 dNm, or 16.40 dNm, or 16.50 dNm, or 16.60 dNm, or 16.70 dNm, or 16.80 dNm, as measured in accordance with ASTM D-5289; and/or
(ii) an ML from 0.450 dNm, or 0.475 dNm, or 0.500 dNm, or 0.525 dNm, or 0.550 dNm to 0.575 dNm, or 0.600 dNm, or 0.625 dNm, or 0.650 dNm, or 0.675 dNm, or 0.700 dNm, as measured in accordance with ASTM D-5289; and/or
(iii) an MH-ML from 14.00 dNm, or 14.25 dNm, or 14.50 dNm, or 14.75 dNm, or 15.00 dNm to 15.25 dNm, or 15.50 dNm, or 15.75 dNm, or 16.00 dNm, or 16.25 dNm, as measured in accordance with ASTM D-5289; and/or
(iv) a ts1 from 0.850 min., or 0.875 min., or 0.900 min., or 0.925 min., or 0.95 min., or 0.975 min. to 1.00 min., or 1.025 min., or 1.050 min., or 1.075 min., or 1.100 min., or 1.125 min., or 1.150 min., or 1.175 min; and/or
(v) a ts2 from 1.04 min., or 1.06 min., or 1.08 min., or 1.10 min, or 1.12 min., or 1.14 min., or 1.16 min., or 1.18 min. to 1.20 min., or 1.22 min., or 1.24 min., or 1.26 min., or 1.28 min., or 1.30 min., or 1.32 min., or 1.34 min., or 1.36 min., or 1.38 min, or 1.40 min.; and/or
(vi) a $t_{90}$ from 7.250 min., or 7.300 min., or 7.350 min., or 7.400 min., or 7.450 min. to 7.500 min., or 7.550 min., or 7.600 min., or 7.650 min., or 7.700 min., or 7.750 min., or 7.800 min,
and the composition is hot air vulcanized into a crosslinked article having one some or all of the following properties:
(vii) an $H_{1714}$ from less than 30, or less than 25, or less than 20, or less than 15 to 10, or 8, or 6, or 5, or 4, or 3, or 2, or 1;
(viii) an $H_{1460}$ from 150, or 155, or 160, or 165, or 170, or 175 to 180, or 185, or 190, or 195, or 200;
(ix) a degradation degree from 0.025, or 0.050, or 0.075, or 0.100, or 0.125, or 0.150, or 0.175 to 0.200, or 0.225, or 0.250, or 0.275, or 0.300; and
(x) a relative degradation of less than 15%, or less than 10%, or less than 5%, or less than 3%, or less than 2%.

In an embodiment, the crosslinked composition is Crosslinked Composition 1, Crosslinked Composition 2, or Crosslinked Composition 3 and comprises at least two, at least three, at least four, at least five, or all six of properties (i)-(vi) and the hot air vulcanized crosslinked article comprises at least one, at least two, at least three, or all four of properties (vii)-(x).

Applicant surprisingly discovered that an EAODM composition composed of (A) an EAODM, (B) an isocyanate comprising at least two isocyanate groups, (C) a TEMPO compound having the Structure I as disclosed herein, and (D) a peroxide, wherein the molar ratio of isocyanate groups of component (B) to the functional groups of component (C) is from 0.80 to 1.10, exhibits good crosslinking and low degradation. Specifically, Applicant discovered that a composition comprising, based on the total weight of the composition, (A) from 70 wt % to 98 wt % ethylene/propylene/diene interpolymer, (B) from 0.5 wt % to 2.0 wt % isocyanate comprising at least two isocyanate groups, (C) from 0.5 wt % to 2.0 wt % of a TEMPO compound having the Structure I as disclosed herein, and (D) from 1.25 wt % to 1.75 wt % peroxide, wherein the molar ratio of isocyanate groups of component (B) to the functional groups of component (C) is from 0.80 to 1.10 exhibits a relative degradation less than 20%, or less than 10%, or less than 5%, or less than 3%, or less than 2%.

In an embodiment, the article is selected from profiles, injection molded parts, gaskets, automotive parts, building and construction materials, shoe components, and tubes.

In an embodiment, the article is an automotive part.

EXPERIMENTAL

I. Materials Used

A1: an ethylene/propylene/ENB terpolymer having a density of 0.88 g/cc measured according to ASTM D792; and ethylene content of 70 wt % measured according to ASTM D3900; an ENB content of 4.9 wt % measured according to ASTM D6049; and a Mooney Viscosity (ML 1+4 at 125° C., ASTM D1646) of 25 measured according to ASTM D6047 available as NORDEL IP 4725 from the Dow Chemical Company.

A2: an ethylene/propylene/ENB terpolymer having a density of 0.88 g/cc measured according to ASTM D792; an ethylene content of 67 wt % measured according to ASTM D3900; an ENB content of 4.9 wt % measured according to ASTM D6047; and a Mooney Viscosity (ML 1+4 at 125° C., ASTM D1646) of 60 measured according to ASTM D6047, available as NORDEL IP 4760 from the Dow Chemical Company.

B1: an aliphatic polyisocyanate based on hexamethylene diisocyanate with a isocyanate content of 23.5+/−0.5 wt % measured according to M105-11909; and an isocyanate functionality of 3, available as Desmodur® N 3900 from Covestro.

B2: a polymeric methylene diphenyl diisocyanate (MDI) with an average molecular weight of 340, a functionality of 2.7, an isocyanate content of 31.4 wt % measured according to ASTM D5155, and an isocyanate functionality of 2.7, available as PAPI 27 from the Dow Chemical Company.

C1: 4-hydroxy-2,2,6,6-tetramethylpiperidin-1-oxyl (97% purity), having one hydroxyl group (functionality=1), available as 4-hydroxy-TEMPO from Sigma-Aldrich.

D1: 2,5-dimethyl-2,5-di(t-butylperoxy)hexane, available as LUPEROX® 101 from Arkema.

Mixer 1: Haake Polylab OS mixer (69 mL volume).

Mixer 2: SYD-2L Experimental Pressure Type Kneader (Banbury mixer).

Roll Mill: LabTech Two-Roll Mill Types LRM-S-200/O.

Press: LabTech LP-S-50/ASTM laboratory hydraulic press.

FT-IR: Perkin Elmer Spectrum 100 FTIR Spectrometer with single bounce ATR with diamond crystal.

II. Preparation of Compression Molded Pre-Preg

A. One Pot Compounding (CS1-CS5 and IE1-IE2)

The Haake mixer is pre-heated and equilibrated at 100° C. The ethylene/alpha-olefin/diene interpolymer (A1), isocyanate component (B1), TEMPO (C1), and peroxide (D1) are added in amounts as described in Table 1. The components are mixed at 35 rotations per minute (rpm) at 100° C. for 4 minutes to form the final blend. The blend is removed from the Haake mixer and cold pressed into a sheet. The polymer sheet (pre-preg) is further fabricated to 1 mm thickness via two roll mill at 75° C.

B. Two-Step Process (IE3-IE4)

The masterbatch is prepared by adding the ethylene/alpha-olefin/diene interpolymer (A2) and the TEMPO compound (C1) to the Banbury mixer in amounts as described in Table 2. The components are mixed at 50° C. at 35 rpm under ambient atmosphere. When the temperature reaches 80° C. (heat is generated from mixing and/or reaction), the isocyanate component (B2) is added in an amount as described in Table 2. The components are continuously mixed under atmosphere for another 15 minutes and cooled to room temperature. No signal is observed at IR analysis at 2275 cm$^{-1}$, which indicates very high conversion of isocyanate functionality. A broad peak around 1730-1650 cm$^{-1}$ is the corresponding free urethane carbonyl and H-bonded urethane carbonyl stretch.

The Haake mixer is preheated and equilibrated at 100° C. The ethylene/alpha-olefin/diene interpolymer (A1), the masterbatch, and peroxide (D1) are added in amounts as described in Table 1. The components are mixed 35 rpm at 100° C. for 4 minutes to form the final blend. The blend is removed from the mixer and cold pressed into sheets. The polymer sheet (pre-preg) is further fabricated to 1 mm thickness via a two roll mill at 75° C.

The molar ratio of isocyanate groups in component (B1) or (B1+B2), depending, to functional groups in component (C1), for both one pot compounding examples and two-step process examples, is calculated using the equation:

$$\text{molar ratio} = \frac{\frac{W_{total\ isocyanate}}{42} \times \text{wt } \%_{isocyanate}}{\frac{W_{TEMPO}}{MW_{TEMPO}} \times functionality_{TEMPO}}$$

wherein $W_{total\ isocyanate}$ is the total weight of isocyanate compound or polymer, 42 is the molecular weight of a single isocyanate group, wt $\%_{isocyanate}$ is the weight percent of isocyanate functionality, $W_{TMEPO}$ is the weight of TEMPO molecule, $MW_{TEMPO}$ is the molecular weight of the TEMPO compound, and functionality$_{TEMPO}$ is the functionality of the TEMPO compound.

For example, with respect to IE1, the total weight of the isocyanate used is 1 g, the weight percent of isocyanate functionality is 23.5%, the weight of the TEMPO compound used is 1 g, the molecular weight of the TEMPO compound is 172 g, and the functionality of the TEMPO compound is 1. The ratio is calculated as follows:

$$\text{molar ratio} = \frac{\frac{W_{total\ isocyanate}}{42} \times \text{wt } \%_{isocyanate}}{\frac{W_{TEMPO}}{MW_{TEMPO}} \times functionality_{TEMPO}} = \frac{\frac{1}{42} * 23.5}{\frac{1}{172} * 1} = \frac{\frac{23.5}{42}}{\frac{1}{172}} = 0.96$$

TABLE 1

Formulations of Comparative Samples (CS) and Inventive Examples (IE)

| | CS1 | CS2 | CS3 | CS4 | CS5 | IE1 | IE2 | IE3 | IE4 |
|---|---|---|---|---|---|---|---|---|---|
| A1 (wt %) | 98.5 | 97.5 | 97.5 | 95.5 | 95.5 | 96.5 | 97.5 | 84.7 | 71.4 |
| B1 (wt %) | | 1.0 | | 1.0 | 2.0 | 1.0 | 0.5 | | |
| C1 (wt %) | | | 1.0 | 2.0 | 1.0 | 1.0 | 0.5 | | |
| D1 (wt %) | 1.5 | 1.5 | 1.5 | 1.5 | 1.5 | 1.5 | 1.5 | 1.5 | 1.5 |
| MB1 (wt %) | | | | | | | | 13.8 | 27.1 |
| Total (wt %) | 100 | 100 | 100 | 100 | 100 | 100 | 100 | 100 | 100 |
| Molar Ratio of Isocyanate Groups in Component (B1) or (B1 + B2) to Functional Groups in Component (C1) | NA | NA | 0 | 0.48 | 1.92 | 0.96 | 0.96 | 1.01 | 1.01 |

CS = comparative sample;
IE = inventive example;
NA = not applicable

TABLE 2

Masterbatch (MB1) Formulation

| Component | Amount (wt %) |
|---|---|
| A2 | 87.5 |
| B2 | 5.5 |
| C1 | 7.0 |
| Molar Ration of Isocyanate Groups in Component (B2) to Functional Groups in Component (C1) | 1.01/1 |

C. Preparation of Compression Molded Disks

Each pre-preg sheet (18 g) is placed into a steel mold (150 mm×100 mm×1 mm). The hydraulic press is preheated to 130° C. The steel mold is transferred into the press, degassed (10 MPa) six times at 130° C., and hot pressed with 10 MPa pressure at 130° C. for 1 minute. The steel mold is then cold pressed (water cooling—circulating with the press) with 10 MPa for 5 minutes. The resulting test specimen pre-preg is a compression molded sheet having dimensions 150 mm×100 mm×1 mm.

The MDR cure properties of each formulation set forth in Table 1 are measured in accordance with ASTM D-5289 and recorded in Table 3 below.

TABLE 3

MDR Properties of CS1-5 and IE1-4

| | CS1 | CS2 | CS3 | CS4 | CS5 | IE1 | IE2 | IE3 | IE4 |
|---|---|---|---|---|---|---|---|---|---|
| Molar Ration of Isocyanate Groups in Component (B1) or (B1 + B2) to Functional Groups in Component (C1) | NA | NA | 0 | 0.48 | 1.92 | 0.96 | 0.96 | 1.01 | 1.01 |
| MH (dNm) | 16.74 | 9.89 | 18.2 | 13.51 | 5.95 | 14.87 | 15.8 | 16.61 | 14.80 |
| ML (dNm) | 0.60 | 0.6 | 0.64 | 0.42 | 0.48 | 0.52 | 0.48 | 0.61 | 0.69 |
| MH-ML (dNm) | 16.14 | 9.43 | 17.56 | 13.09 | 5.49 | 14.35 | 15.32 | 16.00 | 14.11 |
| ts1 (min) | 0.47 | 1.94 | 0.44 | 0.97 | 3.11 | 1.1 | 0.87 | 0.857 | 1.167 |
| ts2 (min) | 0.60 | 2.48 | 0.58 | 1.16 | 4315 | 1.38 | 1.05 | 1.041 | 1.385 |
| t90 (min) | 6.92 | 8.74 | 7.13 | 7.35 | 9.13 | 7.77 | 7.79 | 7.320 | 7.429 |

CS = comparative sample;
IE = inventive example

III. Hot Air Vulcanization

A hot convection oven is preheated and equilibrated at 200° C. under ambient atmosphere. Compression molded pre-pregs are transferred into the oven and kept at 200° C. for 15 minutes with hot air convection for vulcanization. The vulcanized specimens are then removed and cooled to room temperature.

Degradation of the hot air vulcanized samples is determined by FTIR-ATR analysis as described above, and the tackiness of the surface of the samples is determined by the finger test. The results are reported in Table 4, below, and FIG. 1.

TABLE 4

FTIR-ATR and Finger Test Results

| | CS1 | CS2 | CS3 | CS4 | CS5 | IE1 | IE2 | IE3 | IE4 |
|---|---|---|---|---|---|---|---|---|---|
| $H_{1714}$ | 190 | 181 | 110 | 23 | 18 | 29 | 53 | 4 | 7 |
| $H_{1460}$ | 120 | 124 | 108 | 96 | 203 | 200 | 181 | 154 | 154 |

TABLE 4-continued

FTIR-ATR and Finger Test Results

| | CS1 | CS2 | CS3 | CS4 | CS5 | IE1 | IE2 | IE3 | IE4 |
|---|---|---|---|---|---|---|---|---|---|
| D | 1.583 | 1.46 | 1.019 | 0.24 | 0.089 | 0.145 | 0.293 | 0.026 | 0.045 |
| RD | 100% | 92% | 64% | 15% | 6% | 9% | 18% | 1.6% | 2.8% |
| Finger Test Rating | 1 | 1 | 1 | 2 | 3 | 3 | 2 | 3 | 3 |

CS = comparative sample;
IE = inventive example

Comparative Sample 1 (CS1) is the control sample having a formulation of only ethylene/alpha-olefin/diene interpolymer and peroxide (no isocyanate compound and no TEMPO compound). As shown in Table 4, CS1 has a very tacky surface and significant degradation (1.583 degradation). Comparing CS1 to CS2 and CS3 shows that introducing one of an isocyanate component and TEMPO component does not improve surface tackiness and only marginally improves degradation of the hot air vulcanized samples.

As shown by CS4-5 and IE1-4, using an isocyanate component and a TEMPO component together improves degradation during hot air vulcanization, with each of CS4-5 and IE1-4 having a relative degradation of less than 20%. However, when the ratio of the molar amount of hydroxyl functionality in the TEMPO component to the molar amount of isocyanate functionality in the isocyanate component is less than 0.8 (CS4) or higher than 1.1 (CS5), crosslinking density is significantly decreased. For example, CS4 has a TEMPO/isocyanate functionality ratio of 0.53 and a MH-ML of 13.09 dNm and CS5 has a TEMPO/isocyanate functionality ratio of 1.93 and a MH-ML of 5.49.

In contrast, when the ratio of the molar amount of hydroxyl functionality in the TEMPO component to the molar amount of isocyanate functionality in the isocyanate component is between 0.8 and 1.1, the examples show an excellent balance of crosslinking density and surface stability during hot air vulcanization. Each of the inventive examples has a surface tackiness rating of 2 or 3, a relative degradation of less than 20%, and an MH-ML of greater than 14.00 dNm.

A comparison of IE1 and IE2 to IE3 and IE4 shows that adding the isocyanate component and TEMPO component are added to the ethylene/alpha-olefin/diene interpolymer as a masterbatch, as opposed to using a one-step process, does not affect crosslinking density or surface stability.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
a reaction product of a composition comprising
(A) from 95 wt % to 99 wt % of an ethylene/propylene/5-ethylidene-2-norbornene interpolymer;
(B) from 0.5 wt % to 2.0 wt % of an isocyanate comprising at least two isocyanate groups;
(C) from 0.5 wt % to 2.0 wt % of a TEMPO compound having the Structure I

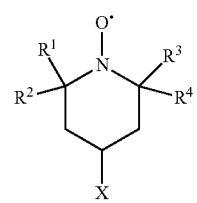

(Structure I)

wherein $R^1$, $R^2$, $R^3$ and $R^4$ are each independently selected from H and $C_1$-$C_6$ alkyl groups and X is a functional group selected from the group consisting of OH and $NH_2$; and
(D) from 1.0 wt % to 2.0 wt % of a peroxide, wherein wt % is based on total weight of the composition;
wherein the molar ratio of isocyanate groups of Component (B) to the functional groups of Component (C) is from 0.80 to 1.10; and
the composition is a crosslinked composition and has
(i) a MH-ML value from 14.00 dNm to 16.50 dNm, and
(ii) a Finger Test rating from 2 to 3.

2. A composition comprising:
a reaction product of a first composition comprising
(A) an ethylene/propylene/5-ethylidene-2-norbornene interpolymer;
a second composition comprising a reaction mixture comprising (B) an isocyanate comprising at least two isocyanate groups and (C) a TEMPO compound having the Structure I

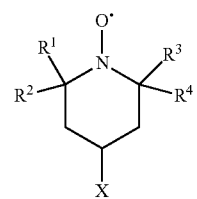

(Structure I)

wherein $R^1$, $R^2$, $R^3$ and $R^4$ are each independently selected from H and $C_1$-$C_6$ alkyl groups and X is a functional group selected from the group consisting of OH or $NH_2$;
the composition comprises
(B) from 0.5 wt % to 2.0 wt % of the isocyanate;
(C) from 0.5 wt % to 2.0 wt % of the TEMPO compound; and
(D) from 1.0 wt % to 2.0 wt % of a peroxide, wherein wt % is based on total weight of the composition,
wherein the molar ratio of isocyanate groups of Component (B) to the functional groups of Component (C) is from 0.80 to 1.10; and the composition is a crosslinked composition and has
(i) a MH-ML value from 14.00 dNm to 16.50 dNm, and
(ii) a Finger Test rating from 2 to 3.

3. The composition of claim 1, wherein the isocyanate has an isocyanate functionality from greater than 2 to 4.

4. The composition of claim 1, wherein each of $R^1$, $R^2$, $R^3$, and $R^4$ is the same.

5. The composition of claim 1, wherein X is OH.

6. The composition of claim 1, wherein the TEMPO compound is 4-hydroxy-TEMPO.

7. The composition of claim 1, wherein the molar ratio of functional groups of Component (B) to the functional groups of Component (C) is from 0.95 to 1.05.

8. A crosslinked composition formed from the composition of claim 1, wherein the crosslinked composition is hot air vulcanized.

9. An article comprising at least one component formed from the composition of claim 8.

10. The article of claim 9, wherein the article is selected from the group consisting of a profile, injection molded part, gasket, automotive part, building material, construction material, shoe component, and tube.

11. The composition of claim 1, wherein the ethylene/propylene/5-ethylidene-2-norbornene interpolymer comprises from 0.5 wt % to 8 wt % of 5-ethylidene-2-norbornene, based on the total weight of the ethylene/propylene/5-ethylidene-2-norbornene interpolymer.

12. The composition of claim 2, wherein the ethylene/propylene/5-ethylidene-2-norbornene interpolymer comprises from 0.5 wt % to 8 wt % of 5-ethylidene-2-norbornene, based on the total weight of the ethylene/propylene/5-ethylidene-2-norbornene interpolymer.

13. The composition of claim 2, wherein the second composition further comprises a second ethylene/propylene/5-ethylidene-2-norbornene interpolymer that is different from the ethylene/propylene/5-ethylidene-2-norbornene interpolymer in component (A).

14. The composition of claim 1 wherein the crosslinked composition has a degradation degree from 0.025 to 0.300.

15. The composition of claim 2 wherein the crosslinked composition has a degradation degree from 0.025 to 0.300.

* * * * *